Feb. 21, 1967   A. A. ELWOOD ET AL   3,304,777
FLUID DIRECTION SYNCHRO
Filed March 30, 1964   5 Sheets-Sheet 1

CURRENT

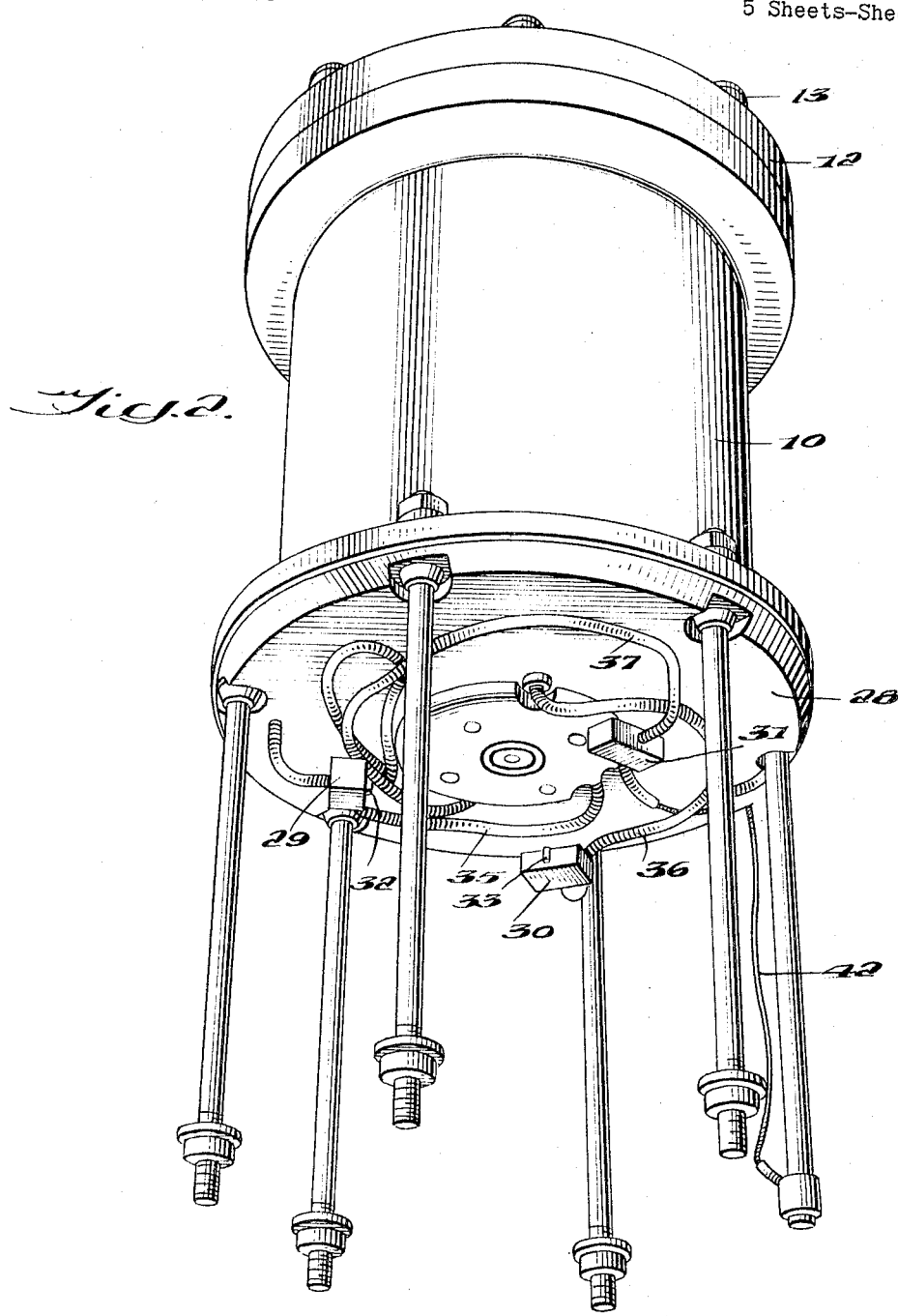

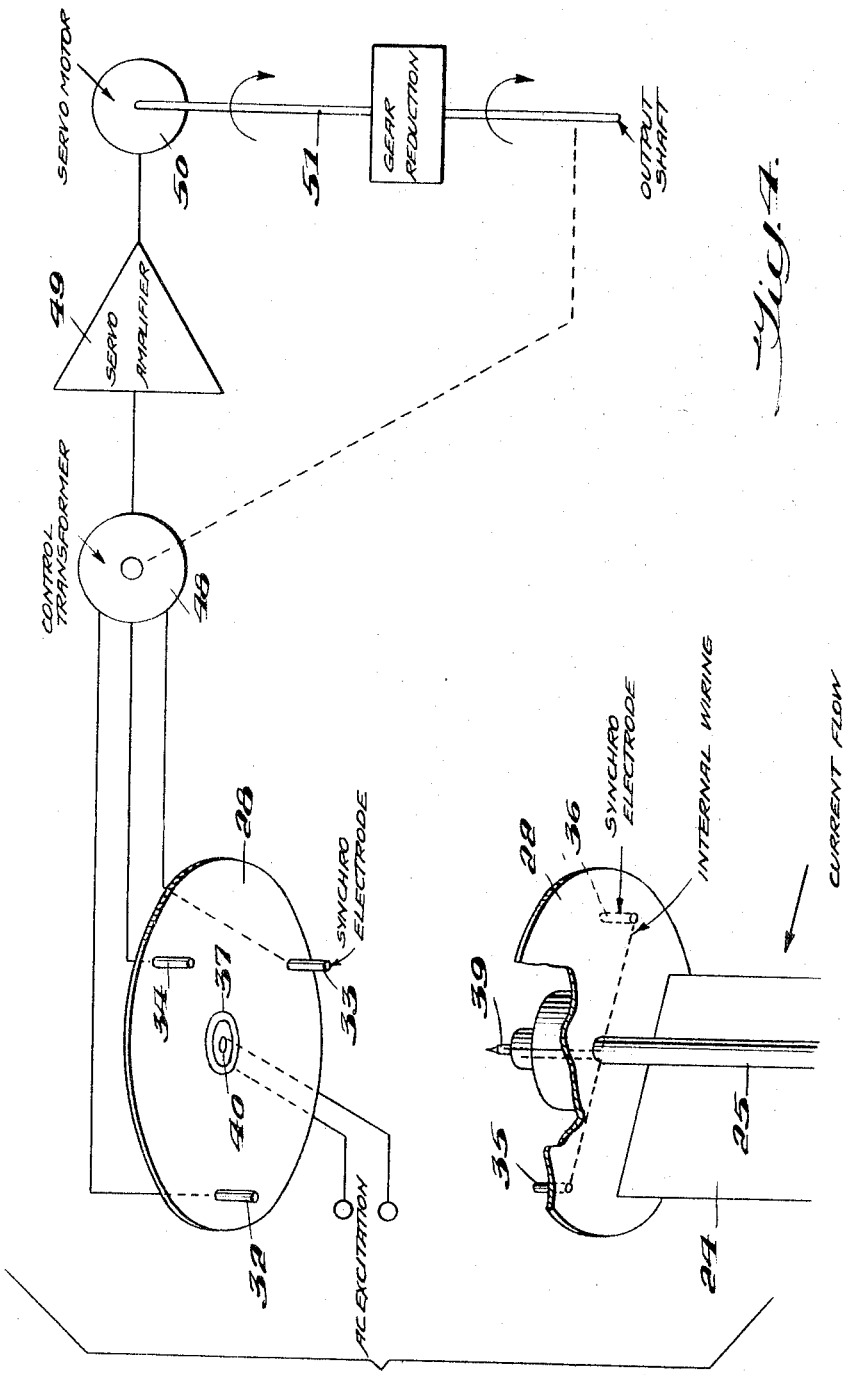

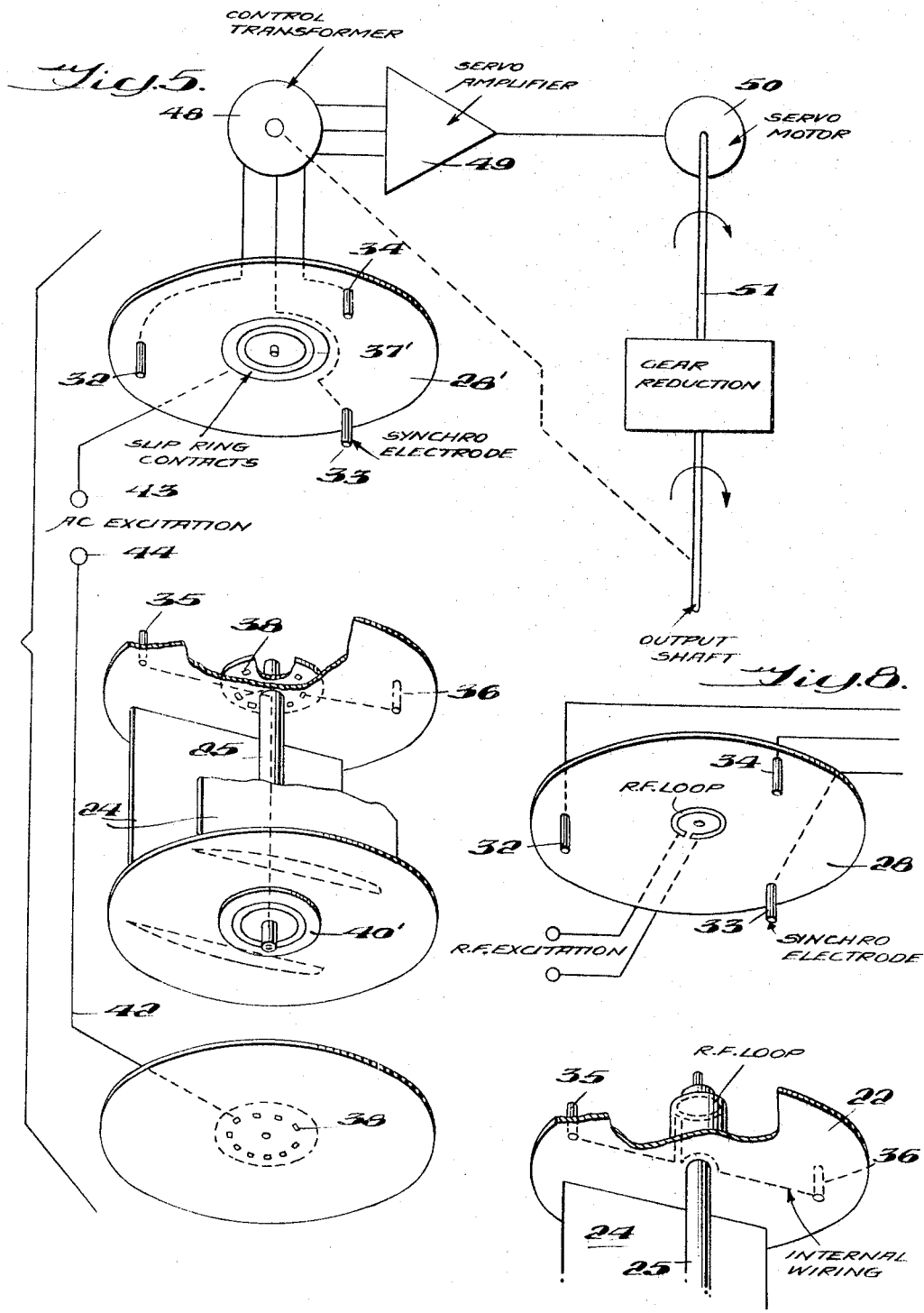

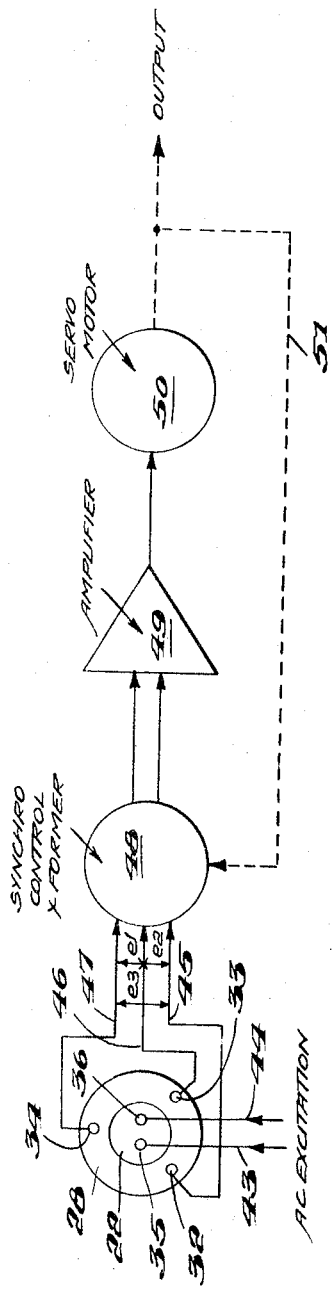
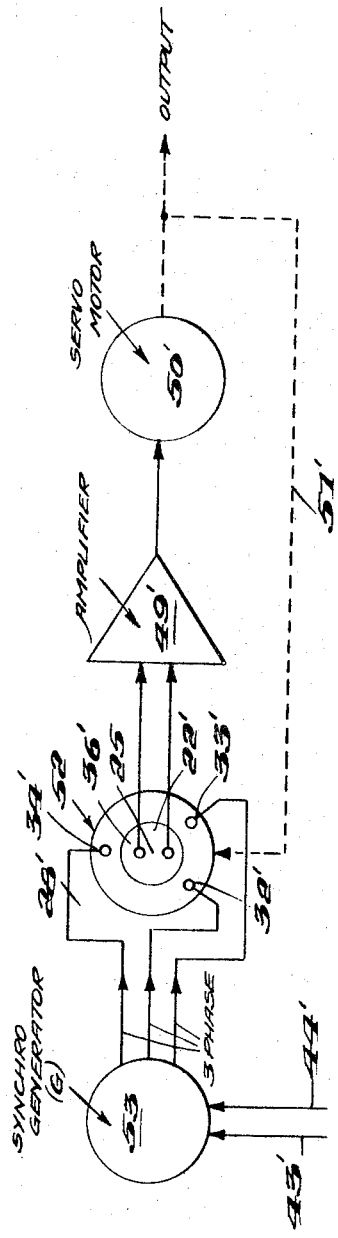

United States Patent Office 3,304,777
Patented Feb. 21, 1967

3,304,777
FLUID DIRECTION SYNCHRO
Albert A. Elwood, Pompano Beach, and Herbert A. Cook, Fort Lauderdale, Fla.; said Elwood assignor to Airpax Electronics Incorporated, Fort Lauderdale, Fla., a corporation of Maryland
Filed Mar. 30, 1964, Ser. No. 355,592
6 Claims. (Cl. 73—188)

This invention relates to a salt water synchro and more specifically to an analog rotary transducer utilizing an electrostatic field in a salt water medium.

Synchros are known in the prior art and normally comprise magnetic poles having complex field and armature windings. Synchros of this type have several disadvantages including the high cost of the magnetic field and armature windings, inaccuracy under salt water conditions, inability to withstand high overload voltage and high power consumption.

Synchros utilizing an electric field are also known in the prior art. In these devices, a capacitance variation which is a function of shaft rotation or linear displacement may be obtained by the use of the ordinary air-dielectric variable-tuning capacitor such as in a radio receiver which is a common capacitive transducer. Capacitance type transducers require the use of a homogeneous, low viscosity dielectric, sturdy blade or plate design with adequate spacing to minimize the effects of minor surface irregularities and to prevent arcing. In general, the capacitance variation transducers are simpler in construction than the magnetic field units mentioned above. The electric field transducer has a smoothly varying output or, in other words, infinite resolution. The electric field transducer produces forces on the moving members which are negligibly small.

In accordance with the present invention, a novel salt water synchro is provided which has all of the above advantages of an electric field transducer and, in addition, overcomes the disadvantages of the magnetic field transducers.

Briefly, the salt water synchro of the present invention is an analog rotary transducer utilizing a dipole in an electric field which converts the angular position of a shaft into alternating current electrical signals on three wires similar to that produced by a synchro generator. In addition, the salt water synchro, in accordance with the present invention, can accept the three wire electrical signals and resolve them into a single alternating current voltage, the amplitude of which is proportional to the displacement of the transducer shaft from null, and the phase of which is relative to the direction of displacement. This operation is similar to a synchro control transformer.

The above is accomplished by utilizing a transducer comprising four pairs of electric dipoles immersed in a conducting fluid. This fluid is normally a salt water solution, though other type solutions containing a conductive impurity could be utilized. The stator includes three electrodes spaced 120° apart, each combination of two of these electrodes forming one of the dipole outputs. The rotor comprises a fourth pair of electrodes, or a dipole, and is rotatable with respect to the triplet array of the stator electrodes. The stator electrodes can be in the form of strips, or button-type electrodes or pins. The salt water synchro in accordance with this invention can be used as part of a synchro generator or as part of a synchro control transformer, or as a position indicator.

It is an object of this invention to provide a transducer that utilizes pairs of electric dipoles for position indicating.

It is a further object of this invention to provide a synchro for operation in an electrically conductive solution such as salt water.

It is a still further object of this invention to provide a salt water synchro utilizing electric dipoles in an electric field.

It is a yet further object of this invention to provide a salt water synchro which is simple to construct, accurate, low in cost of manufacture, capable of withstanding overload surges, and low in power consumption.

The above and further objects of this invention will become apparent to those skilled in the art from the following description of a preferred embodiment of the invention which is provided by way of example and not by way of limitation, wherein:

FIGURE 2 is a perspective view of the underside of the housing of FIGURE 1 with parts removed showing the three electrodes of the salt water synchro.

FIGURE 4 is a schematic view showing the electromechanical arrangement with one type of power input.

FIGURE 5 is similar to FIGURE 4 showing an arrangement for an alternate type of power input.

FIGURE 6 is a schematic diagram of the salt water synchro in accordance with the present invention, utilized as a synchro generator.

FIGURE 7 is a schematic diagram of the salt water synchro in accordance with the present invention, utilized as a synchro control transformer.

FIGURE 8 is an illustration of the R.F. Loop for inductive coupling.

Figure 1:
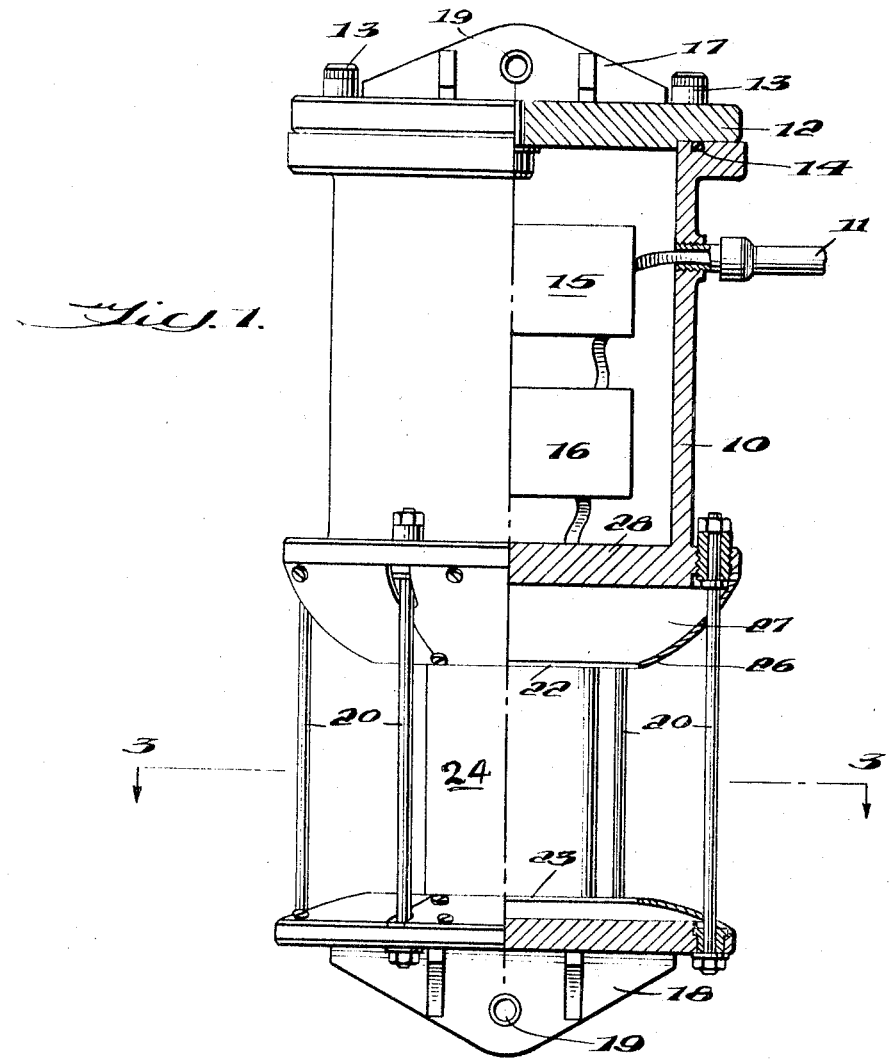
FIGURE 1 is an elevational view, partly in section showing a housing in which the salt water synchro may be placed.

The so called salt water synchro is shown in the drawings incorporated in a device which is adapted for use for studying the direction of ocean currents. For purposes of understanding the invention, it will be described in connection with the device but it is to be understood that the salt water synchro has many applications as a synchro generator or synchro control transformer.

Figure 3:
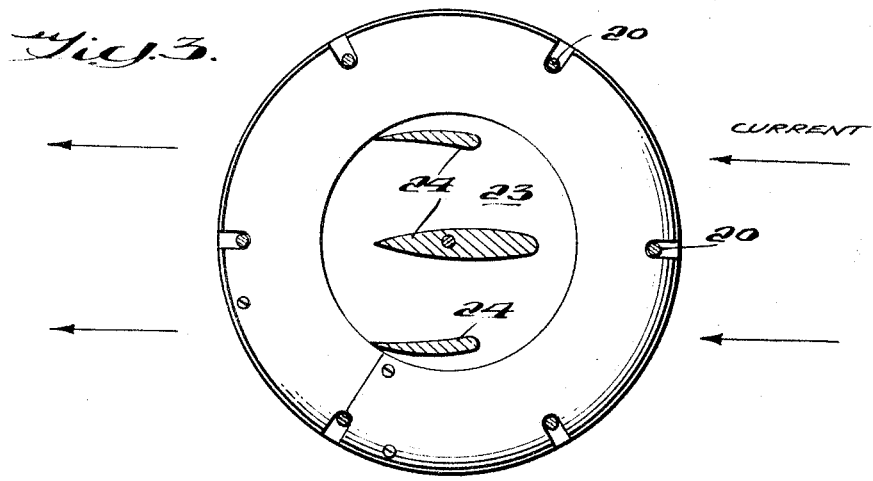
FIGURE 3 is a section taken on line 3—3 of FIGURE 1.

The device shown in FIGURES 1-3 consists of a unit comprising a closed water-tight housing or chamber 10, having a cable 11 for electrical power input and provision for signal output. Cover 12 is bolted at 13—13 to chamber 10 and sealed at 14 for the protection of electrical components 15, 16 located within the chamber 10. Top web 17 and bottom web 18 have holes 19 therein so that the unit may be lowered by a cable or connected to other units measuring different factors in the depths of the ocean and each one sends to the surface its separate information by electrical cables.

Depending from chamber 10 by a plurality of rods 20, is a vane assembly 21 consisting of top and bottom plates 22, 23 having a plurality of vanes 24 mounted therebetween and pivoted as at 25 for independent rotation with respect to the chamber assembly.

Cover 26 is secured to the bottom of the chamber 10 forming a compartment 27 below chamber 10 and above the top plate 22 of the vane assembly and the bottom 28 of the chamber 10.

As will be seen from FIGURE 2, in the compartment 27 there are located three blocks 29, 30, 31 spaced 120° apart, on which are secured electrodes 32, 33 (34 does not appear in this figure) which are connected by wires 35, 36, 37 passing through the bottom 28 of chamber 10 to connect the electrodes 32, 33, 34 to other components in units 16, 15 located within the chamber. Cover 26 on the underside of the chamber 10 has openings around the rods 20 of sufficient size to flood the compartment with the fluid in which the device is submerged.

As will be seen from FIGURE 3, the vane assembly 21 is such that a current will cause the vane assembly 21 to assume a position aligned with the current irrespective of the position of the overall assembly on which it is pivoted.

In FIGURE 1, a unit 15 is shown electrically connected to the electrical components of unit 16 receiving signals from the three electrodes 32, 33, 34 described in connection with FIGURE 2. Unit 15 includes a compass device giving a compass bearing indicating the orientation of the whole assembly, which is sometimes referred to as a fluxmeter. The output of the fluxmeter in unit 15 is integrated with a signal from unit 16 indicating a position of the vanes with respect to the housing 10 and the compass bearing of the housing, from which will be derived a signal showing the bearing of the vanes with respect to the compass position within the housing.

In other words, the device provides two signals, one for a magnetic compass orientation and the other, a current flow orientation, which are integreated to show a net signal indicating the position or direction of current flow with respect to the magnetic field of the earth. Separate signals of these separate parameters, however, may be transmitted via cable 11 to the surface.

FIGURE 4 shows diagrammatically, the three synchro electrodes 32, 33, 34 mounted on the underside 28 of the chamber, and the plate 22 which carries vanes 24, and the two electrodes 35, 36 or dipole carried by plate 22. An alternating current for exciting dipoles 35, 36 on the movable vane assembly 21 are connected to a slip ring 37 which is, in turn, connected to sliding contacts 38 on the movable vane assembly as shown in FIGURE 5. The other contact is the center pivot pin 39 and another contact is a ring 40 surrounding the pin 39. On the vane assembly 21 pin 39 and contact 38 are electrically contacted to a dipole 35, 36 mounted on the upper plate 22. It can be seen that, as the current flow over the assembly moves the vanes 24, the dipole 35, 36 on the movable assembly will assume different positions with respect to the tripole 32, 33, 34 or pairs of dipoles on the fixed plate 28.

In this embodiment it will be noted that the A.C. excitation of the dipole 35, 36 is accomplished by the slip ring 37 and ring 40 on the fixed plate 28 carrying the tripole 32, 33, 34.

FIGURE 5 is a similar arrangement showing the excitation of the dipole 35, 36 by a single slip ring 37' on the plate 28' carrying tripole 32, 33, 34 and another slip ring 40' on the bearing plate 23 in which the vane assembly 21 is mounted. A cable 42 is shown on FIGURE 2 to provide the electrical excitation for the lower slip ring 40' in this embodiment. A single slip ring 37' is shown on the fixed plate 28' carrying the tripole 32, 33, 34 and a plurality of contacts 38 on the vane assembly 21. However, any type of slip ring and contact means may be employed. Slip rings may be replaced by an inductive coupling in which a current of high frequency will be employed to transmit the excitation signal and avoid the use of slip rings which of course avoids the corrosion problem. This embodiment is illustrated in FIGURE 8.

Referring now to the diagrammatic showing in FIGURE 6 of the salt water synchro, the plate 22 carrying the dipole 35, 36 is shown which can be rotated by any means notwithstanding the fact that it has been described above in connection with a current direction indicating vane.

Referring to FIGURE 6, the diagrammatic showing of the salt water synchro includes a plate 22 having any means such as the vanes described above but for purposes of this description may be a vane submerged in water actuated by the direction of current flow. The plate 22 includes a pair of electrodes 35 and 36 forming a dipole. Terminals 43 and 44 are coupled to the electrodes 35 and 36 respectively. The stator 28 comprises three electrodes 32, 33 and 34 spaced mechanically 120° apart. Terminals 45, 46 and 47, respectively are connected to electrodes 32, 33 and 34. When terminals 45, 46 and 47 are utilized as output terminals, output signals are taken between each possible combination of terminals 45, 46, and 47 as shown at $e_1$, $e_2$ and $e_3$. That is, one output is taken across terminals 33, 34, a second output is taken across terminals 32, 33 and a third output is taken across terminals 32, 34. Each pair of electrodes acts as a dipole.

The stator 28 may have electrodes 32, 33, 34 which may be strip or pin elements or button type elements that may be mounted on axially extending walls.

An A.C. voltage is supplied to the rotor electrodes 43, 44 causing a current flow in the conductive fluid (salt water) positioned in the space within the synchro between the stator 28 and rotor 22 and creating an electric field about the rotor. The electric field induces voltages in the stator dipoles 32, 33, 34 and the magnitude of the voltages induced in each stator dipole depends upon the angular position of the rotor. The voltages across each of the three stator dipoles are all in phase, but the amplitudes thereof vary with the sine of the angle $\theta$ between the dipole axes.

If the stator dipoles are arranged at 120° mechanical spacing from one another, the voltage at each output terminal 45, 46, 47 is $$e_1 = E_{max} \sin 2\pi \text{ ft. } \sin \theta$$
$$e_2 = E_{max} \sin 2\pi \text{ ft. } \sin (\theta + 120°)$$
$$e_3 = E_{max} \sin 2\pi \text{ ft. } \sin (\theta + 240°)$$

$E_{max}$ is the peak voltage induced in each stator dipole and $f$ the frequency of the alternating voltage applied to the rotor. For a given set of stator voltages, there will be only one corresponding rotor position. The output of the synchro is transferred to the synchro control transformer 48 and then to amplifier 49 and servo motor 50. A feed back loop 51 may be present from the servo motor 50 to the synchro control transformer 48.

Referreing to FIGURE 7, the synchro in accordance with the present invention is utilized as a synchro control transformer 52. An A.C. voltage with magnitude and phase dependent on the rotor position and on the signal applied to the three stator dipoles 32', 33', 34' is supplied from the rotor terminals 35', 36' when three phase voltage is supplied by synchro generator 53 to the electrodes 32', 33', 34' of the stator 28'. Since the rotor dipole 35', 36' is never connected to the A.C. supply 43', 44', it induces no voltage in the stator dipoles. As a result, the stator dipole field magnitudes are determined only by the voltages applied to the stator electrodes 32', 33', 34'. The rotor 22' is constructed so that rotor position has very little effect on the stator dipole fields. Also, there is never any appreciable current flowing in the rotor dipole because its output voltage is always applied to a relatively high impedance load. Therefore, the rotor does not tend to develop any torque when voltages are applied to the stator dipoles. The rotor shaft 25' of the transformer 52 is turned by an external means and produces varying output voltages from the rotor dipole thereof. The rotor voltage is fed to a servo motor 50' through a servo amplifier 49' and a null is obtained by driving the rotor of the salt water synchro control transformer from the servo motor output as shown at 51'. The amplitude and phase of the voltage induced on the rotor dipole is dependent upon the angular displacement of the salt water synchro transformer rotor with respect to the rotor of the transmitter supplying the synchro control transformer.

It should be understood that although the invention has been described as a salt water synchro, for applications other than those requiring submergence in the sea, other conducting fluids may be used. A sealed industrial unit, for example, may use a very weak acid solution or a gas. Also, the synchro has been described utilizing a single dipole as the rotor and a triplet dipole as the stator. The synchro could be constructed using the triplet dipole as the stator and the single dipole as the rotor.

Though the invention has been described with respect to a specific embodiment, it should be understood that many other embodiments will become obvious to those skilled in the art from the foregoing. Accordingly, it is the intention that following claims be interpreted as broadly as possible in view of the prior art.

What is claimed is:

1. A transducer for transmitting a signal which is a measure of relative rotational displacement of one body to another, comprising two sets of electrodes immersed in a conductive fluid medium, a first set including a dipole mounted symmetrically about an axis, a second set including three electrodes symmetrically mounted about said axis in such a manner that relative rotational motion can be effected between said two sets of electrodes, said dipole and said tripole being spaced a fixed distance apart along said axis whereby each is positioned substantially in the plane of the electric field of the other, means to place an electric signal on one of said sets of electrodes to induce an electric signal in the other of said sets of electrodes so that the electric signal output of one of said sets of electrodes will induce a signal in the other of said sets of electrodes that is a measure of the rotational displacement of said one set of electrodes with respect to the said other set of electrodes.

2. A transducer comprising two sets of electrodes immersed in a conductive fluid medium, a first set including a dipole mounted symmetrically about an axis, a second set including three electrodes forming a tripole symmetrically mounted about said axis in such a manner that relative rotational motion can be effected between said two sets of electrodes, said dipole and said tripole being so arranged along said axis that each is positioned substantially in the plane of the electric field of the other, means to place an electric signal on one of said sets of electrodes to induce an electric signal in the other of said sets of electrodes so that the electric signal output of one of said sets of electrodes will induce a signal in the other of said sets of electrodes that is a measure of the rotational displacement of said one set of electrodes with respect to the other set of electrodes, and vane means responsive to current flow in the medium in which the transducer is immersed to effect relative rotational motion between the two sets of electrodes.

3. A transducer as set forth in claim 2, wherein the two sets of electrodes are immersed in a conductive fluid medium of salt water.

4. A current flow direction indicating device comprising a housing, means in said housing to give a signal indicative of the orientation of said housing, a transducer including two sets of electrodes, a first set including a dipole mounted symmetrically upon an axis, a second set including three electrodes forming a tripole symmetrically arranged with respect to said axis and mounted so that the relative rotational motion can be effected between said two sets of electrodes, said dipole and said tripole being so arranged along said axis that each is positioned substantially in the plane of the electric field of the other, means to place an electric signal on one of said sets of electrodes to induce an electric signal in the other of said sets of electrodes so that the electric signal output of one set of electrodes will induce a signal in the other set of electrodes that is a measure of rotational displacement of one set of electrodes with respect to the other set of electrodes, one of said sets of electrodes being mounted on said housing, the other of the set of electrodes being moved by means actuated in response to the current flow of the fluid in which the device is positioned, and means to effect signal means indicative of the position of the flow responsive means representative of the current flow with respect to the position of the housing that is the orientation position of the housing.

5. A transducer as set forth in claim 4 in which the means to place an electric signal on one of said sets of electrodes is a high frequency electric coupling.

6. A transducer as set forth in claim 4 in which the means to place an electric signal on one of said sets of electrodes is a slip ring and contact assembly.

References Cited by the Examiner

UNITED STATES PATENTS 2,822,540   2/1958   Butler.
2,996,712   8/1961   Richman _____ 343—113

RICHARD C. QUEISSER, *Primary Examiner.*

E. D. GILHOOLY, *Assistant Examiner.*